United States Patent Office 2,867,939
Patented Jan. 13, 1959

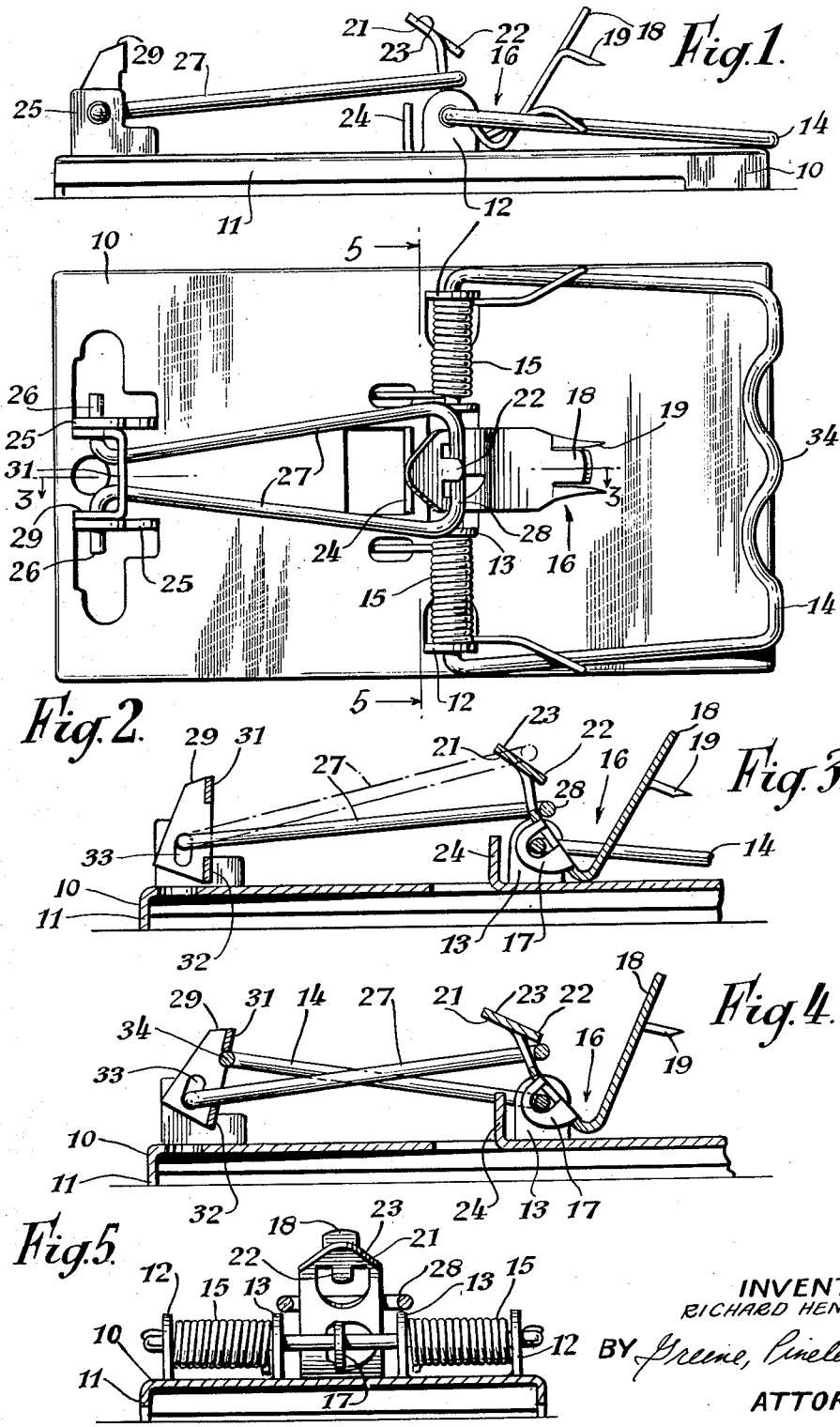

2,867,939

TRAPS FOR MICE, RATS OR THE LIKE VERMIN

Richard Henry Evans, Fetcham, England, assignor to J. P. Braun, New York, N. Y.

Application May 24, 1956, Serial No. 587,034

3 Claims. (Cl. 43—83.5)

This invention relates to vermin traps such as are commonly used for catching mice and rats, of the kind comprising a pivotally mounted jaw spring biassed to a forward position and adapted to be retained in a rearward, set position by means including a combined trigger and bait carrier which is displaced to release the jaw by an animal attempting to eat the bait.

It has already been proposed to provide traps of this kind in which setting is effected automatically by merely moving the jaw to the set position, and the object of the present invention is to provide a trap in which the automatic setting is effected in an improved manner calling for less skill on the part of the operator.

According to the present invention, in a vermin trap comprising a base, a jaw pivotally mounted on the base and spring-biassed to a forward position, and means to hold said jaw in a rearward, set position, said means including a combined trigger and bait carrier, a catch member adapted to engage the jaw in its rearward, set position is retained in engagement with the jaw by a catch holding arm, engagement of the catch member with the jaw, and engagement of the catch holding arm with the trigger being effected automatically by moving the jaw to its rearward position.

The catch holding arm may be pivotally mounted on the base, the catch member being loosely mounted on the pivot of the said arm and the catch member, when engaged by the jaw, being urged thereby to a position in which it is held by the catch holding arm against backward tilting movement, but being free to tilt backwardly to a small extent when not engaged by the jaw.

The catch holding arm preferably lies underneath the jaw when the latter is in its rearward, set position, and is urged downwardly into engagement with the trigger by the movement of the jaw to the set position.

The invention is hereinafter described with reference to the accompanying drawings, in which:

Figure 1 is a side elevation of one form of trap according to the invention the trap being in the released position;

Figure 2 is a plan view of the trap, also in the released position;

Figure 3 is a partial side elevation of the trap, in the released position, with some parts in section on the line 3—3 of Figure 2;

Figure 4 is a view similar to Figure 3 but showing the trap in the set position; and Figure 5 is a section on the line 5—5 of Figure 2.

Referring to the drawings, the trap comprises a base 10 stamped and pressed from sheet metal, the base having a downwardly extending peripheral flange 11. Two outer lugs 12, 12 and two inner lugs 13, 13 are struck up from the base 10 on a transverse line adjacent the centre thereof, the lugs 12 and 13 being formed with aligned holes to receive the aligned end portions of a loop of stiff wire forming a jaw 14. One of the end portions extends through one lug 12 and both lugs 13, the other extending only through the other lug 12. The jaw 14 is bent to zig-zag form at the part thereof remote from the lugs 12, 13, portions of the zig-zag projecting beyond the end of the base to form a finger grip, and two helical springs 15, 15 each mounted between one lug 12 and the adjacent lug 13, act in torsion between the jaw and the base to urge the former to the position shown in Figures 1 and 2, hereinafter called the forward position.

The portion of the jaw loop between the two lugs 13, 13 provides a pivot for a combined bait carrier and trigger 16. The part 16 is pressed from sheet metal and bent to the shape shown, a single lug 17, apertured to receive the portion of the jaw loop, being struck out from the part 16 intermediate its ends. At one end of the part 16, which constitutes the bait carrier 18, there are formed prongs 19 on which bait may be impaled, and the other end, which constitutes the trigger 21 is formed with a forwardly projecting finger 22 above which the said part slopes upwardly and rearwardly at 23. A lug 24 struck from the base limits movement of the part 16 about its pivot in a backward direction.

Another pair of lugs 25, 25, struck up from the base 10 near the rear end thereof, are apertured to receive the out-turned ends 26, 26 of a generally hairpin shaped wire member 27 constituting a catch holding arm, the loop 28 of which is adapted to co-operate with the finger 22 of the trigger 21.

A catch member 29, in the form of a piece of metal bent to channel-shape and having the central portion of the base of the channel cut away to leave upper and lower transverse bars 31 and 32 has longitudinal slots 33, 33, in its side walls, the catch holding arm 27 passing through the space between the bars 31 and 32, and the ends 26, 26 of the said arm passing through the slots 33. The weight distribution of the catch member 29 about the ends 26, 26 of the catch holding arm is such that it tends to tilt forwardly, and, owing to the provision of the slots 33, an upward pull on the catch member moves the lower bar 32 towards the arm 27, thus limiting the balanced pivotal movement of the catch member as compared with the movement available when the said catch member is allowed to drop to its lower position.

The parts are so positioned and dimensioned that, when the jaw 14 is swung over to a rearward position, as shown in Figure 4, the central portion 34 of its zig-zag end engages below the upper bar 31 of the catch member 29, and lifts the said catch member to bring the lower bar 32 into engagement with the underside of the arm 27, applying an upward load to the said arm which urges it against the finger 22 as shown in Figure 4. The catch member 29, being held by the arm 27, which is in turn held by the trigger 21, cannot be forced to rock rearwardly by the jaw springs, so the trap is held in a set position until released by movement of the trigger. Release may be effected by either a rearward or a lateral push on the trigger, which, owing to its being mounted by means of the single lug 17, can rock sideways as well as turning about a horizontal axis.

The part 16 is biassed by its weight towards the position shown in Figures 1 and 3, the lug 24 being so positioned as to ensure that it cannot swing rearwardly to a position in which its centre of gravity is transferred to the rearward side of its pivot, and the catch member 29 is so shaped at its lower end that it cannot swing rearwardly far enough to allow the arm 27 to move to a position at right angles to the base. Thus, when the trap is placed on a flat surface, the parts assume automatically the positions shown in full lines in Figures 1 and 3, or a position in which the arm 27 rests on the surface 23 of the trigger, as shown in chain-dotted lines in Figure 3. The trap can therefore be set merely by swinging the jaw rearwardly until it presses down on the arm 27, and then allowing it to move upwardly until it engages the bar 31 of the catch member. If the arm 27 was in the position shown in chain-dotted lines in Figure 3, it is pushed down by the jaw to the position shown in full lines in that figure, and so is caught by the finger 22 when it is subsequently lifted by the catch member when the latter is engaged by the jaw. The catch member is free to rock backwardly to allow the jaw to pass during the downward movement of the latter.

Thus the setting of the trap is effected automatically by the rearward swinging of the jaw, and no preliminary adjustment or positioning of the parts is required.

It will be understood that modifications may be made in the trap within the scope of the invention. For example, the working parts may be mounted on a wooden base, and the catch holding arm may be a pressed sheet metal part instead of being formed of wire.

I claim:

1. In a vermin trap of the type comprising a base, a jaw pivotally mounted on the base and spring biased to a forward position, means to releasably hold said jaw in a rearward set position, and a combined bait carrier and trigger for said last named means, said means comprising a catch member having an upper bar portion adapted to engage said jaw in the rearward position of the latter, said catch member also including a lower bar portion, a catch holding arm extending towards said trigger and bait carrier, means for pivotally mounting the rearward end of said catch holding arm to said base adjacent the rearward position of said jaw, means for pivotally mounting said catch member adjacent the rearward position of said jaw with said arm passing between the upper and lower bar portions of said catch member whereby the pivotal movement of the catch member is limited by contact of said lower bar with said arm, means for pivotally mounting said trigger and bait carrier so that in one position the trigger thereof is adapted to releasably hold the forward end of said arm in a position in which the catch holding arm and lower bar of the catch member permits the pivotal movement of the catch member to the rear to an extent insufficient to release the jaw held by the upper bar of said catch member.

2. In the device as claimed in claim 1 wherein said mounting means for said combined trigger and bait carrier comprises a single lug for pivotally and loosely mounting the same adjacent the mounting for said jaw whereby said trigger can be moved laterally as well as directly away from the contacting portion of said catch holding arm to release the latter.

3. The device as claimed in claim 1 wherein the means for pivotally mounting the catch member comprises lugs extending to the rear thereof so that said catch member is forwardly biased toward said jaw, said trigger and bait carrier having means extending rearwardly to support said forward end of said catch holding arm in a position adjacent to the catch of the trigger and bait carrier when said arm is released by said catch, the mounting means for said trigger and bait carrier being towards the rear side thereof so as to bias the same toward the front thereof whereby the trap may be automatically set by moving said jaw to its rearward position, pressing said jaw below the upper bar portion of said forwardly biased catch member and releasing the jaw when held by the upper bar of said forwardly biased catch member.

References Cited in the file of this patent

UNITED STATES PATENTS

| | | |
|---|---|---|
| 1,541,856 | Sands | June 16, 1925 |
| 1,576,647 | Furuya | Mar. 16, 1926 |
| 2,511,519 | Van Brunt | June 13, 1950 |